US009201501B2

(12) United States Patent
Maizels et al.

(10) Patent No.: US 9,201,501 B2
(45) Date of Patent: Dec. 1, 2015

(54) ADAPTIVE PROJECTOR

(71) Applicant: PRIMESENSE LTD., Tel Aviv (IL)

(72) Inventors: Aviad Maizels, Ramat Hasharon (IL); Alexander Shpunt, Tel Aviv (IL); Tamir Berliner, Beit Hashmonay (IL)

(73) Assignee: APPLE INC., Cupertino, CA (US)

( * ) Notice: Subject to any disclaimer, the term of this patent is extended or adjusted under 35 U.S.C. 154(b) by 488 days.

(21) Appl. No.: 13/726,129

(22) Filed: Dec. 23, 2012

(65) Prior Publication Data

US 2013/0106692 A1 May 2, 2013

Related U.S. Application Data

(63) Continuation-in-part of application No. PCT/IB2011/053192, filed on Jul. 18, 2011.

(60) Provisional application No. 61/365,788, filed on Jul. 20, 2010.

(51) Int. Cl.
G06F 3/01 (2006.01)
G06T 19/00 (2011.01)
H04N 13/00 (2006.01)
H04N 13/04 (2006.01)

(52) U.S. Cl.
CPC .............. G06F 3/013 (2013.01); G06F 3/011 (2013.01); G06F 3/017 (2013.01); G06T 19/006 (2013.01); H04N 13/0055 (2013.01); H04N 13/0468 (2013.01); H04N 13/044 (2013.01); H04N 13/0459 (2013.01); H04N 13/0484 (2013.01)

(58) Field of Classification Search
None
See application file for complete search history.

(56) References Cited

U.S. PATENT DOCUMENTS

| | | | |
|---|---|---|---|
| 4,550,250 A | 10/1985 | Mueller et al. | |
| 4,789,921 A | 12/1988 | Aho | |
| 4,988,981 A | 1/1991 | Zimmerman et al. | |
| 5,495,576 A | 2/1996 | Ritchey | |
| 5,588,139 A | 12/1996 | Lanier et al. | |
| 5,594,469 A | 1/1997 | Freeman et al. | |
| 5,846,134 A | 12/1998 | Latypov | |
| 5,852,672 A | 12/1998 | Lu | |
| 5,862,256 A | 1/1999 | Zetts et al. | |
| 5,864,635 A | 1/1999 | Zetts et al. | |
| 5,870,196 A | 2/1999 | Lulli et al. | |

(Continued)

FOREIGN PATENT DOCUMENTS

| | | | |
|---|---|---|---|
| JP | 2002228413 A | 8/2002 | |
| JP | 2008090807 A | 4/2008 | |

(Continued)

OTHER PUBLICATIONS

Gordon et al., "The use of Dense Stereo Range Date in Augmented Reality", Proceedings of the 1st International Symposium on Mixed and Augmented Reality (ISMAR), Darmstadt, Germany, pp. 1-10, Sep. 30-Oct. 1, 2002.

(Continued)

Primary Examiner — Maurice L McDowell, Jr.
(74) Attorney, Agent, or Firm — D. Kligler I.P. Services LTD.

(57) ABSTRACT

An apparatus for processing data includes a projector, which is configured to project content onto at least a part of a scene. A processor is configured to detect a location of an eye of a person in the scene and to control the projector so as to reduce an intensity of the projected content in an area of the eye.

18 Claims, 7 Drawing Sheets

(56) References Cited

U.S. PATENT DOCUMENTS

| | | |
|---|---|---|
| 5,917,937 A | 6/1999 | Szeliski et al. |
| 5,973,700 A | 10/1999 | Taylor et al. |
| 6,002,808 A | 12/1999 | Freeman |
| 6,084,979 A | 7/2000 | Kanade et al. |
| 6,243,054 B1 | 6/2001 | DeLuca |
| 6,252,988 B1 | 6/2001 | Ho |
| 6,256,033 B1 | 7/2001 | Nguyen |
| 6,262,740 B1 | 7/2001 | Lauer et al. |
| 6,345,111 B1 | 2/2002 | Yamaguchi et al. |
| 6,345,893 B2 | 2/2002 | Fateh et al. |
| 6,452,584 B1 | 9/2002 | Walker et al. |
| 6,456,262 B1 | 9/2002 | Bell |
| 6,507,353 B1 | 1/2003 | Huard et al. |
| 6,512,838 B1 | 1/2003 | Rafii et al. |
| 6,519,363 B1 | 2/2003 | Su et al. |
| 6,559,813 B1 | 5/2003 | DeLuca et al. |
| 6,681,031 B2 | 1/2004 | Cohen et al. |
| 6,686,921 B1 | 2/2004 | Rushmeier et al. |
| 6,690,370 B2 | 2/2004 | Ellenby et al. |
| 6,741,251 B2 | 5/2004 | Malzbender |
| 6,791,540 B1 | 9/2004 | Baumberg |
| 6,803,928 B2 | 10/2004 | Bimber et al. |
| 6,853,935 B2 | 2/2005 | Satoh et al. |
| 6,857,746 B2 | 2/2005 | Dyner |
| 6,977,654 B2 | 12/2005 | Malik et al. |
| 7,003,134 B1 | 2/2006 | Covell et al. |
| 7,013,046 B2 | 3/2006 | Kawamura et al. |
| 7,023,436 B2 | 4/2006 | Segawa et al. |
| 7,042,440 B2 | 5/2006 | Pryor et al. |
| 7,042,442 B1 | 5/2006 | Kanevsky et al. |
| 7,151,530 B2 | 12/2006 | Roeber et al. |
| 7,170,492 B2 | 1/2007 | Bell |
| 7,215,815 B2 | 5/2007 | Honda |
| 7,227,526 B2 | 6/2007 | Hildreth et al. |
| 7,259,747 B2 | 8/2007 | Bell |
| 7,264,554 B2 | 9/2007 | Bentley |
| 7,289,227 B2 | 10/2007 | Smetak et al. |
| 7,301,648 B2 | 11/2007 | Foxlin |
| 7,302,099 B2 | 11/2007 | Zhang et al. |
| 7,333,113 B2 | 2/2008 | Gordon |
| 7,340,077 B2 | 3/2008 | Gokturk |
| 7,348,963 B2 | 3/2008 | Bell |
| 7,358,972 B2 | 4/2008 | Gordon et al. |
| 7,370,883 B2 | 5/2008 | Basir et al. |
| 7,427,996 B2 | 9/2008 | Yonezawa et al. |
| 7,428,542 B1 | 9/2008 | Fink et al. |
| 7,474,256 B2 | 1/2009 | Ohta et al. |
| 7,526,120 B2 | 4/2009 | Gokturk et al. |
| 7,536,032 B2 | 5/2009 | Bell |
| 7,573,480 B2 | 8/2009 | Gordon |
| 7,576,727 B2 | 8/2009 | Bell |
| 7,580,572 B2 | 8/2009 | Bang et al. |
| 7,590,941 B2 | 9/2009 | Wee et al. |
| 7,688,998 B2 | 3/2010 | Tuma et al. |
| 7,696,876 B2 | 4/2010 | Dimmer et al. |
| 7,724,250 B2 | 5/2010 | Ishii et al. |
| 7,762,665 B2 | 7/2010 | Vertegaal et al. |
| 7,774,155 B2 | 8/2010 | Sato et al. |
| 7,812,842 B2 | 10/2010 | Gordon |
| 7,821,541 B2 | 10/2010 | Delean |
| 7,840,031 B2 | 11/2010 | Albertson et al. |
| 7,844,914 B2 | 11/2010 | Andre et al. |
| 7,925,549 B2 | 4/2011 | Looney et al. |
| 7,971,156 B2 | 6/2011 | Albertson et al. |
| 8,150,142 B2 | 4/2012 | Freedman et al. |
| 8,166,421 B2 | 4/2012 | Magal et al. |
| 8,249,334 B2 | 8/2012 | Berliner et al. |
| 8,290,208 B2 | 10/2012 | Kurtz et al. |
| 8,368,647 B2 | 2/2013 | Lin |
| 8,390,821 B2 | 3/2013 | Shpunt et al. |
| 8,400,494 B2 | 3/2013 | Zalevsky et al. |
| 8,493,496 B2 | 7/2013 | Freedman et al. |
| 8,514,221 B2 | 8/2013 | King et al. |
| 2002/0057383 A1 | 5/2002 | Iwamura |
| 2002/0071607 A1 | 6/2002 | Kawamura et al. |
| 2002/0158873 A1 | 10/2002 | Williamson |
| 2003/0057972 A1 | 3/2003 | Pfaff et al. |
| 2003/0063775 A1 | 4/2003 | Rafii et al. |
| 2003/0088463 A1 | 5/2003 | Kanevsky |
| 2003/0156756 A1 | 8/2003 | Gokturk et al. |
| 2003/0185444 A1 | 10/2003 | Honda |
| 2003/0235341 A1 | 12/2003 | Gokturk et al. |
| 2004/0046744 A1 | 3/2004 | Rafii et al. |
| 2004/0104935 A1 | 6/2004 | Williamson et al. |
| 2004/0135744 A1 | 7/2004 | Bimber et al. |
| 2004/0174770 A1 | 9/2004 | Rees |
| 2004/0183775 A1 | 9/2004 | Bell |
| 2004/0184640 A1 | 9/2004 | Bang et al. |
| 2004/0184659 A1 | 9/2004 | Bang et al. |
| 2004/0258314 A1 | 12/2004 | Hashimoto |
| 2007/4025831 | 12/2004 | Hashimoto |
| 2005/0031166 A1 | 2/2005 | Fujimura et al. |
| 2005/0088407 A1 | 4/2005 | Bell et al. |
| 2005/0089194 A1 | 4/2005 | Bell |
| 2005/0110964 A1 | 5/2005 | Bell et al. |
| 2005/0117132 A1 | 6/2005 | Agostinelli |
| 2005/0122308 A1 | 6/2005 | Bell et al. |
| 2005/0162381 A1 | 7/2005 | Bell et al. |
| 2005/0190972 A1 | 9/2005 | Thomas et al. |
| 2005/0254726 A1 | 11/2005 | Fuchs et al. |
| 2005/0265583 A1 | 12/2005 | Covell et al. |
| 2006/0010400 A1 | 1/2006 | Dehlin et al. |
| 2006/0092138 A1 | 5/2006 | Kim et al. |
| 2006/0110008 A1 | 5/2006 | Vertegaal et al. |
| 2006/0115155 A1 | 6/2006 | Lui et al. |
| 2006/0139314 A1 | 6/2006 | Bell |
| 2006/0149737 A1 | 7/2006 | Du et al. |
| 2006/0159344 A1 | 7/2006 | Shao et al. |
| 2006/0187196 A1 | 8/2006 | Underkoffler et al. |
| 2006/0239670 A1 | 10/2006 | Cleveland |
| 2006/0248475 A1 | 11/2006 | Abrahamsson |
| 2007/0078552 A1 | 4/2007 | Rosenberg |
| 2007/0154116 A1 | 7/2007 | Shieh |
| 2007/0230789 A1 | 10/2007 | Chang et al. |
| 2008/0062123 A1 | 3/2008 | Bell |
| 2008/0094371 A1 | 4/2008 | Forstall et al. |
| 2008/0123940 A1 | 5/2008 | Kundu et al. |
| 2008/0150890 A1 | 6/2008 | Bell et al. |
| 2008/0150913 A1 | 6/2008 | Bell et al. |
| 2008/0170776 A1 | 7/2008 | Albertson et al. |
| 2008/0236902 A1 | 10/2008 | Imaizumi |
| 2008/0252596 A1 | 10/2008 | Bell et al. |
| 2008/0256494 A1 | 10/2008 | Greenfield |
| 2008/0260250 A1 | 10/2008 | Vardi |
| 2008/0287189 A1 | 11/2008 | Rabin |
| 2009/0009593 A1 | 1/2009 | Cameron et al. |
| 2009/0027335 A1 | 1/2009 | Ye |
| 2009/0027337 A1 | 1/2009 | Hildreth |
| 2009/0031240 A1 | 1/2009 | Hildreth |
| 2009/0040215 A1 | 2/2009 | Afzulpurkar et al. |
| 2009/0077504 A1 | 3/2009 | Bell |
| 2009/0078473 A1 | 3/2009 | Overgard et al. |
| 2009/0083122 A1 | 3/2009 | Angell et al. |
| 2009/0083622 A1 | 3/2009 | Chien et al. |
| 2009/0096783 A1 | 4/2009 | Shpunt et al. |
| 2009/0183125 A1 | 7/2009 | Magal et al. |
| 2009/0195392 A1 | 8/2009 | Zalewski |
| 2009/0228841 A1 | 9/2009 | Hildreth |
| 2009/0256817 A1 | 10/2009 | Perlin et al. |
| 2009/0297028 A1 | 12/2009 | De Haan |
| 2010/0002936 A1 | 1/2010 | Khomo et al. |
| 2010/0007717 A1 | 1/2010 | Spektor et al. |
| 2010/0034457 A1 | 2/2010 | Berliner et al. |
| 2010/0036717 A1 | 2/2010 | Trest |
| 2010/0053151 A1 | 3/2010 | Marti et al. |
| 2010/0071965 A1 | 3/2010 | Hu et al. |
| 2010/0149096 A1 | 6/2010 | Migos et al. |
| 2010/0164897 A1 | 7/2010 | Morin et al. |
| 2010/0177933 A1 | 7/2010 | Willmann et al. |
| 2010/0199228 A1 | 8/2010 | Latta et al. |
| 2010/0234094 A1 | 9/2010 | Gagner et al. |
| 2010/0235786 A1 | 9/2010 | Maizels et al. |
| 2011/0006978 A1 | 1/2011 | Yuan |
| 2011/0018795 A1 | 1/2011 | Jang |

(56) References Cited

U.S. PATENT DOCUMENTS

| | | |
|---|---|---|
| 2011/0029918 A1 | 2/2011 | Yoo et al. |
| 2011/0052006 A1 | 3/2011 | Gurman et al. |
| 2011/0081072 A1 | 4/2011 | Kawasaki et al. |
| 2011/0164032 A1 | 7/2011 | Shadmi |
| 2011/0164141 A1 | 7/2011 | Tico et al. |
| 2011/0193939 A1 | 8/2011 | Vassigh et al. |
| 2011/0211754 A1 | 9/2011 | Litvak et al. |
| 2011/0225536 A1 | 9/2011 | Shams et al. |
| 2011/0227820 A1 | 9/2011 | Haddick et al. |
| 2011/0231757 A1 | 9/2011 | Haddick et al. |
| 2011/0248914 A1 | 10/2011 | Sherr |
| 2011/0254765 A1 | 10/2011 | Brand |
| 2011/0254798 A1 | 10/2011 | Adamson et al. |
| 2011/0260965 A1 | 10/2011 | Kim et al. |
| 2011/0261058 A1 | 10/2011 | Luo |
| 2011/0279397 A1 | 11/2011 | Rimon et al. |
| 2011/0291926 A1 | 12/2011 | Gokturk et al. |
| 2011/0292036 A1 | 12/2011 | Sali et al. |
| 2011/0293137 A1 | 12/2011 | Gurman et al. |
| 2011/0310010 A1 | 12/2011 | Hoffnung et al. |
| 2012/0001875 A1 | 1/2012 | Li et al. |
| 2012/0078614 A1 | 3/2012 | Galor et al. |
| 2012/0169583 A1 | 7/2012 | Rippel et al. |
| 2012/0202569 A1 | 8/2012 | Maizels et al. |
| 2012/0204133 A1 | 8/2012 | Guendelman et al. |
| 2012/0223882 A1 | 9/2012 | Galor et al. |
| 2012/0313848 A1 | 12/2012 | Galor et al. |
| 2013/0014052 A1 | 1/2013 | Frey et al. |
| 2013/0044053 A1 | 2/2013 | Galor et al. |
| 2013/0055120 A1 | 2/2013 | Galor et al. |
| 2013/0055150 A1 | 2/2013 | Galor |
| 2013/0058565 A1 | 3/2013 | Rafii et al. |
| 2013/0106692 A1 | 5/2013 | Maizels et al. |
| 2013/0107021 A1 | 5/2013 | Maizels et al. |
| 2013/0127854 A1 | 5/2013 | Shpunt et al. |
| 2013/0147686 A1* | 6/2013 | Clavin et al. ............... 345/8 |
| 2013/0155070 A1 | 6/2013 | Luo |
| 2013/0207920 A1 | 8/2013 | McCann et al. |
| 2013/0222239 A1 | 8/2013 | Galor |
| 2013/0263036 A1 | 10/2013 | Berenson et al. |
| 2013/0265222 A1 | 10/2013 | Berenson et al. |
| 2013/0283208 A1 | 10/2013 | Bychkov et al. |
| 2013/0283213 A1 | 10/2013 | Bychkov et al. |

FOREIGN PATENT DOCUMENTS

| | | |
|---|---|---|
| JP | 2009151380 A | 7/2009 |
| JP | 2010067062 A | 3/2010 |
| WO | 9935633 A1 | 7/1999 |
| WO | 03071410 A2 | 8/2003 |
| WO | 2004107272 A1 | 12/2004 |
| WO | 2005003948 A1 | 1/2005 |
| WO | 2005094958 A1 | 10/2005 |
| WO | 2007078639 A1 | 7/2007 |
| WO | 2007135376 A2 | 11/2007 |
| WO | 2012107892 A1 | 8/2012 |

OTHER PUBLICATIONS

Agrawala et al., "The two-user Responsive Workbench :support for collaboration through individual views of a shared space", Proceedings on the 24th conference on computer graphics and interactive techniques (SIGGRAPH 97), Los Angeles, USA, pp. 327-332 , Aug. 3-8, 1997.

Harman et al., "Rapid 2D-to 3D conversion", Proceedings of SPIE Conference on Stereoscopic Displays and Virtual Reality Systems, vol. 4660, pp. 78-86, Jan. 21-23, 2002.

Hoff et al., "Analysis of head pose accuracy in augmented reality", IEEE Transactions on Visualization and Computer Graphics, vol. 6, No. 4, pp. 319-334, Oct.-Dec. 2000.

Poupyrev et al., "The go-go interaction technique: non-liner mapping for direct manipulation in VR", Proceedings of the 9th annual ACM Symposium on User interface software and technology (UIST '96), Washington, USA, pp. 79-80, Nov. 6-8, 1996.

Wexelblat et al. "Virtual Reality Applications and Explorations", Academic Press Inc., San Diego, USA, 262 pages, year 1993.

U.S. Appl. No. 13/161,508 Office Action dated Apr. 10, 2013.

U.S. Appl. No. 12/683,452 Office Action dated Jun. 7, 2013.

Miller, R., "Kinect for XBox 360 Review", Engadget, Nov. 4, 2010.

U.S. Appl. No. 13/161,508 Office Action dated Sep. 9, 2013.

International Application PCT/IB2013/052332 Search Report dated Aug. 26, 2013.

U.S. Appl. No. 13/314,210 Office Action dated Jul. 19, 2013.

U.S. Appl. No. 13/314,207 Office Action dated Aug. 5, 2013.

Sun et al., "SRP Based Natural Interaction Between Real and Virtual Worlds in Augmented Reality", Proceedings of the International Conference on Cyberworlds (CW'08), pp. 117-124, Sep. 22-24, 2008.

Schmalstieg et al., "The Studierstube Augmented Reality Project", Presence: Teleoperators and Virtual Environments, vol. 11, No. 1, pp. 33-54, Feb. 2002.

Ohta et al., "Share-Z: Client/Server Depth Sensing for See-Through Head-Mounted Displays", Presence: Teleoperators and Virtual Environments, vol. 11, No. 2, pp. 176-188, Apr. 2002.

Gobbetti et al., "VB2: an Architecture for Interaction in Synthetic Worlds", Proceedings of the 6th Annual ACM Symposium on User Interface Software and Technology (UIST'93), pp. 167-178, Nov. 3-5, 1993.

Gargallo et al., "Bayesian 3D Modeling from Images Using Multiple Depth Maps", Proceedings of the IEEE Computer Society Conference on Computer Vision and Pattern Recognition (CVPR'05), vol. 2, pp. 885-891, Jun. 20-25, 2005.

ZRRO LTD., "TeleTouch Device", year 2011 (http://www.zrro.com/products.html).

Berliner et al., U.S. Provisional U.S. Appl. No. 61/732,354 filed Dec. 12, 2012.

Shpunt et al., U.S. Provisional U.S. Appl. No. 61/764,554 filed Feb. 14, 2013.

U.S. Appl. No. 13/244,490 Office Action dated Dec. 6, 2013.

U.S. Appl. No. 13/423,314 Office Action dated Dec. 4, 2013.

U.S. Appl. No. 13/423,322 Office Action dated Nov. 1, 2013.

International Application # PCT/IB2013/061269 Search Report dated Apr. 3, 2014.

JP Application # 2013-520267 Office Action dated Mar. 16, 2015.

U.S. Appl. No. 13/726,128 Office Action dated May 6, 2015.

Bleiwess et al., "Fusing Time-of-Flight Depth and Color for Real-Time Segmentation and Tracking", Dyn3D 2009, Lecture Notes in Computer Science 5742, pp. 58-69, Jena, Germany, Sep. 9, 2009.

Bleiwess et al., "Markerless Motion Capture Using a Single Depth Sensor", SIGGRAPH Asia 2009, Yokohama, Japan, Dec. 16-19, 2009.

Bevilacqua et al., "People Tracking Using a Time-Of-Flight Depth Sensor", Proceedings of the IEEE International Conference on Video and Signal Based Surveillance, Sydney, Australia, Nov. 22-24, 2006.

Bradski, G., "Computer Vision Face Tracking for Use in a Perceptual User Interface", Intel Technology Journal, vol. 2, issue 2 (2nd Quarter 2008).

Comaniciu et al., "Kernel-Based Object Tracking", IEEE Transactions on Pattern Analysis and Machine Intelligence, vol. 25, No. 5, pp. 564-577, May 2003.

GESTURETEC INC. "Gesture Control Solutions for Consumer Devices", Canada, 2009.

Gokturk et al., "A Time-Of-Flight Depth Sensor—System Description, Issues and Solutions", Proceedings of the 2004 Conference on Computer Vision and Patter Recognition Workshop (CVPRW'04), vol. 3, pp. 35, Jun. 27-Jul. 2, 2004.

Grest et al., "Single View Motion Tracking by Depth and Silhouette Information", SCIA 2007—Scandinavian Conference on Image Analysis, Lecture Notes in Computer Science 4522, pp. 719-729, Aalborg, Denmark, Jun. 10-14, 2007.

Haritaoglu et al., "Ghost 3d: Detecting Body Posture and Parts Using Stereo", Proceedings of the IEEE Workshop on Motion and Video Computing (MOTION'02), pp. 175-180, Orlando, USA, Dec. 5-6, 2002.

(56) References Cited

OTHER PUBLICATIONS

Haritaoglu et al., "W45 : A real-time system for detecting and tracking people in 2<1/2>D", ECCV 98—5th European conference on computer vision, vol. 1407, pp. 877-892, Freiburg , Germany, Jun. 2-6, 1998.

Harville, M., "Stereo Person Tracking with Short and Long Term Plan-View Appearance Models of Shape and Color", Proceedings of the IEEE International Conference on Advanced Video and Signal-Based Surveillance (AVSSS-2005), pp. 522-527, Como, Italy, Sep. 15-16, 2005.

Holte, M., "Fusion of Range and Intensity Information for View Invariant Gesture Recognition", IEEE Conference on Computer Vision and Pattern Recognition Workshops (CVPRW '08), pp. 1-7, Anchorage, USA, Jun. 23-28, 2008.

Kaewtrakulpong et al., "An Improved Adaptive Background Mixture Model for Real-Time Tracking with Shadow Detection", Proceedings of the 2nd European Workshop on Advanced Video Based Surveillance Systems (AVBS'01), Kingston, UK, Sep. 2001.

Kolb et al., "ToF-Sensors: New Dimensions for Realism and Interactivity", Proceedings of the IEEE Conference on Computer Vision and Patter Recognition Workshops, pp. 1-6, Anchorage, USA, Jun. 23-28, 2008.

Kolsch et al., "Fast 2D Hand Tracking with Flocks of Features and Multi-Cue Integration", IEEE Workshop on Real-Time Vision for Human Computer Interaction (at CVPR'04), Washington, USA, Jun. 27-Jul. 2, 2004.

Krumm et al., "Multi-Camera Multi-Person Tracking for EasyLiving", 3rd IEEE International Workshop on Visual Surveillance, Dublin; Ireland, Jul. 1, 2000.

Leens et al., "Combining Color, Depth, and Motion for Video Segmentation", ICVS 2009—7th International Conference on Computer Vision Systems, Liege, Belgium Oct. 13-15, 2009.

MacCormick et al., "Partitioned Sampling, Articulated Objects, and Interface-Quality Hand Tracking", ECCV '00—Proceedings of the 6th European Conference on Computer Vision-Part II , pp. 3-19, Dublin, Ireland, Jun. 26-Jul. 1, 2000.

Malassiotis et al., "Real-Time Hand Posture Recognition Using Range Data", Image and Vision Computing, vol. 26, No. 7, pp. 1027-1037, Jul. 2, 2008.

Morano et al., "Structured Light Using Pseudorandom Codes", IEEE Transactions on Pattern Analysis and Machine Intelligence, vol. 20, issue 3, pp. 322-327, Mar. 1998.

Munoz-Salinas et al., "People Detection and Tracking Using Stereo Vision and Color", Image and Vision Computing, vol. 25, No. 6, pp. 995-1007, Jun. 1, 2007.

Nanda et al., "Visual Tracking Using Depth Data", Proceedings of the 2004 Conference on Computer Vision and Patter Recognition Workshop, vol. 3, Washington, USA, Jun. 27-Jul. 2, 2004.

Scharstein et al., "High-Accuracy Stereo Depth Maps Using Structured Light", IEEE Conference on Computer Vision and Patter Recognition, vol. 1, pp. 195-2002, Madison, USA, Jun. 2003.

Shi et al., "Good Features to Track", IEEE Conference on Computer Vision and Pattern Recognition, pp. 593-600, Seattle, USA, Jun. 21-23, 1994.

Siddiqui et al., "Robust Real-Time Upper Body Limb Detection and Tracking", Proceedings of the 4th ACM International Workshop on Video Surveillance and Sensor Networks, Santa Barbara, USA, Oct. 27, 2006.

Softkinetic S.A. IISU™—3D Gesture Recognition Platform for Developers of 3D Applications, Belgium, Brussels, 2007-2010.

Sudderth et al., "Visual Hand Tracking Using Nonparametric Belief Propagation", IEEE Workshop on Generative Model Based Vision at CVPR'04, Washington, USA, Jun. 27-Jul. 2, 2004.

Tsap, L., "Gesture-Tracking in Real Time with Dynamic Regional Range Computation", Real-Time Imaging, vol. 8, issue 2, pp. 115-126, Apr. 2002.

Xu et al., "A Multi-Cue-Based Human Body Tracking System", Proceedings of the 5ths International Conference on Computer Vision Systems (ICVS 2007), Germany, Mar. 21-24, 2007.

Xu et al., "Human Detecting Using Depth and Gray Images", Proceedings of the IEE Conference on Advanced Video and Signal Based Surveillance (AVSS'03), Miami, USA, Jul. 21-22, 2003.

Yilmaz et al., "Object Tracking: A Survey", ACM Computing Surveys, vol. 38, No. 4, article 13, Dec. 2006.

Zhu et al., "Controlled Human Pose Estimation From Depth Image Streams", IEEE Conference on Computer Vision and Patter Recognition Workshops, pp. 1-8, Anchorage, USA, Jun. 23-27, 2008.

International Application PCT/IB2010/051055 Search Report dated Sep. 1, 2010.

La Viola, J. Jr., "Whole-Hand and Speech Input in Virtual Environments", Computer Science Department, Florida Atlantic University, USA, 1996.

Martell, C., "Form: An Experiment in the Annotation of the Kinematics of Gesture", Dissertation, Computer and Information Science; University of Pennsylvania, 2005.

U.S. Appl. No. 12/352,622 Official Action dated Mar. 31, 2011.

Prime Sense Inc. "Prime Sensor™ NITE 1.1 Framework Programmer's Guide", Version 1.2, year 2009.

Primesense Corporation, "PrimeSensor Reference Design 1.08", USA, year 2010.

International Application PCT/IB2011/053192 Search Report dated Dec. 6, 2011.

U.S. Appl. No. 12/352,622 Official Action dated Sep. 30, 2011.

Hart, D., U.S. Appl. No. 09/616,606 "Method and System for High Resolution , Ultra Fast 3-D Imaging" filed on Jul. 14, 2000.

International Application PCT/IL2007/000306 Search Report dated Oct. 2, 2008.

International Application PCT/IL2007/000574 Search Report dated Sep. 10, 2008.

International Application PCT/IL2006/000335 Preliminary Report on Patentability dated Apr. 24, 2008.

Avidan et al., "Trajectory triangulation: 3D reconstruction of moving points from amonocular image sequence", IEEE Transactions on Pattern Analysis and Machine Intelligence (PAMI), vol. 22, No. 4, pp. 348-3537, Apr. 2000.

Leclerc et al., "The direct computation of height from shading", The Proceedings of the IEEE Computer Society Conference on Computer Vision and Pattern Recognition (CVPR), pp. 552-558, USA, Jun. 1991.

Zhang et al., "Shape from intensity gradient", IEEE Transactions on Systems, Man and Cybernetics—Part A: Systems and Humans, vol. 29, No. 3, pp. 318-325, May 1999.

Zhang et al., "Height recovery from intensity gradients", IEEE Computer Society Conference on Computer Vision and Pattern Recognition (CVPR), pp. 508-513, Jun. 21-23, 1994.

Horn, B., "Height and gradient from shading", International Journal of Computer Vision, vol. 5, No. 1, pp. 37-76, Aug. 1990.

Bruckstein, A., "On shape from shading", Computer Vision, Graphics & Image Processing, vol. 44, pp. 139-154, year 1988.

Zhang et al., "Rapid Shape Acquisition Using Color Structured Light and Multi-Pass Dynamic Programming", 1st International Symposium on 3D Data Processing Visualization and Transmission (3DPVT), Italy, Jul. 2002.

Besl, P., "Active, Optical Range Imaging Sensors", Machine vision and applications, vol. 1, pp. 127-152, year 1988.

Horn et al., "Toward optimal structured light patterns", Proceedings of International Conference on Recent Advances in 3D Digital Imaging and Modeling, pp. 28-37, Ottawa, Canada, May 1997.

Goodman, J.W., "Statistical Properties of Laser Speckle Patterns", Laser Speckle and Related Phenomena, pp. 9-75, Springer-Verlag, Berlin Heidelberg, 1975.

Asada et al., "Determining Surface Orientation by Projecting a Stripe Pattern", IEEE Transactions on Pattern Analysis and Machine Intelligence (PAMI), vol. 10, No. 5, pp. 749-754, Sep. 1988.

Winkelbach et al., "Shape from Single Stripe Pattern Illumination", Luc Van Gool (Editor), (DAGM 2002), Lecture Notes in Computer Science 2449, p. 240-247, Springer 2002.

Koninckx et al., "Efficient, Active 3D Acquisition, based on a Pattern-Specific Snake", Luc Van Gool (Editor), (DAGM 2002), Lecture Notes in Computer Science 2449, pp. 557-565, Springer 2002.

(56) References Cited

OTHER PUBLICATIONS

Kimmel et al., "Analyzing and synthesizing images by evolving curves with the Osher-Sethian method", International Journal of Computer Vision, vol. 24, No. 1, pp. 37-56, year 1997.
Zigelman et al., "Texture mapping using surface flattening via multi-dimensional scaling", IEEE Transactions on Visualization and Computer Graphics, vol. 8, No. 2, pp. 198-207, Apr. 2002.
Dainty, J.C. "Introduction", Laser Speckle and Related Phenomena, pp. 1-7, Springer-Verlag, Berlin Heidelberg, 1975.
Mendlovic et al., "Composite harmonic filters for scale, projection and shift invariant pattern recognition", Applied Optics Journal, vol. 34, No. 2, Jan. 10, 1995.
Fua et al., "Human Shape and Motion Recovery Using Animation Models", 19th Congress, International Society for Photogrammetry and Remote Sensing, Amsterdam, The Netherlands, Jul. 2000.
Allard et al., "Marker-less Real Time 3D modeling for Virtual Reality", Immersive Projection Technology, Iowa State University, year 2004.
Howe et al., "Bayesian Reconstruction of 3D Human Motion from Single-Camera Video", Advanced in Neural Information Processing Systems, vol. 12, pp. 820-826, USA 1999.
Li et al., "Real-Time 3D Motion Tracking with Known Geometric Models", Real-Time Imaging Journal, vol. 5, pp. 167-187, Academic Press 1999.
Grammalidis et al., "3-D Human Body Tracking from Depth Images Using Analysis by Synthesis", Proceedings of the IEEE International Conference on Image Processing (ICIP2001), pp. 185-188, Greece, Oct. 7-10, 2001.
Segen et al., "Shadow gestures: 3D hand pose estimation using a single camera", Proceedings of IEEE International Conference on Computer Vision and Pattern Recognition, pp. 479-485, Fort Collins, USA, 1999.
Vogler et al., "ASL recognition based on a coupling between HMMs and 3D motion analysis", Proceedings of IEEE International Conference on Computer Vision, pp. 363-369, Mumbai, India, 1998.
Nam et al., "Recognition of Hand Gestures with 3D, Nonlinear Arm Movements", Pattern Recognition Letters, vol. 18, No. 1, pp. 105-113, Elsevier Science B.V. 1997.
Nesbat, S., "A System for Fast, Full-Text Entry for Small Electronic Devices", Proceedings of the 5th International Conference on Multimodal Interfaces, ICMI 2003, Vancouver, Nov. 5-7, 2003.
Ascension Technology Corporation, "Flock of Birds: Real-Time Motion Tracking", 2008.
Segen et al., "Human-computer interaction using gesture recognition and 3D hand tracking", ICIP 98, Proceedings of the IEEE International Conference on Image Processing, vol. 3, pp. 188-192, Oct. 4-7, 1998.
Dekker, L., "Building Symbolic Information for 3D Human Body Modeling from Range Data", Proceedings of the Second International Conference on 3D Digital Imaging and Modeling, IEEE computer Society, pp. 388-397, 1999.
Holte et al., "Gesture Recognition using a Range Camera", Technical Report CVMT-07-01 ISSN 1601-3646, Feb. 2007.
Cheng et al., "Articulated Human Body Pose Inference from Voxel Data Using a Kinematically Constrained Gaussian Mixture Model", CVPR EHuM2: 2nd Workshop on Evaluation of Articulated Human Motion and Pose Estimation, 2007.
MICROVISION INC., "PicoP® Display Engine—How it Works", 1996-2012.
PRIMESENSE CORPORATION, "PrimeSensor NITE 1.1", USA, year 2010.
ARM LTD., "AMBA Specification: AHB", Version 2, pp. 35-92, year 1999.
COMMISSION REGULATION (EC) No. 1275/2008, Official Journal of the European Union, Dec. 17, 2008.
PRIMESENSE, "Natural Interaction", YouTube Presentation, Jun. 9, 2010 http://www.youtube.com/watch?v=TzLKsex43zl~.
Manning et al., "Foundations of Statistical Natural Language Processing", chapters 6,7,9 and 12, MIT Press 1999.
U.S. Appl. No. 12/762,336 Official Action dated May 15, 2012.
Tobii Technology, "The World Leader in Eye Tracking and Gaze Interaction", Mar. 2012.
Noveron, "Madison video eyewear", year 2012.
International Application PCT/IB2012/050577 Search Report dated Aug. 6, 2012.
U.S. Appl. No. 12/683,452 Official Action dated Sep. 7, 2012.
Koutek, M., "Scientific Visualization in Virtual Reality: Interaction Techniques and Application Development", PhD Thesis, Delft University of Technology, 264 pages, Jan. 2003.
Azuma et al., "Recent Advances in Augmented Reality", IEEE Computer Graphics and Applications, vol. 21, issue 6, pp. 34-47, Nov. 2001.
Breen et al., "Interactive Occlusion and Collision of Real and Virtual Objects in Augmented Reality", Technical Report ECRC-95-02, ECRC, Munich, Germany, 22 pages, year 1995.
Burdea et al., "A Distributed Virtual Environment with Dextrous Force Feedback", Proceedings of Interface to Real and Virtual Worlds Conference, pp. 255-265, Mar. 1992.
CN Application # 201180027794.5 Office Action dated Jul. 3, 2014.

\* cited by examiner

ADAPTIVE PROJECTOR

CROSS-REFERENCE TO RELATED APPLICATIONS

This application is a continuation-in-part of PCT Patent Application PCT/IB2011/053192, filed Jul. 18, 2011, which claims the benefit of U.S. Provisional Application No. 61/365,788, filed Jul. 20, 2010. This application is related to another U.S. patent application, filed on even date, entitled "Interactive Reality Augmentation for Natural Interaction". All of these related applications are incorporated herein by reference.

BACKGROUND OF THE INVENTION

1. Field of the Invention

This invention relates generally to natural interaction systems. More particularly this invention relates to adaptive reality augmentation and 3-dimensional input interfaces.

2. Description of the Related Art

Natural user interfaces are gaining momentum in the entertainment and computer industry. Gesture controls are supplementing or replacing more conventional and less natural interfaces such as keyboard and mouse, game controller, and remote control. The user interactions, however, continue to relate largely to the computer monitor, thus limiting applicability and ease of use of such interfaces. Some of the gesture controls rely on optical 3-dimensional mapping.

Various methods are known in the art for optical 3-D mapping, i.e., generating a 3-dimensional profile of the surface of an object by processing an optical image of the object. This sort of profile is also referred to as a depth map or depth image, and 3-D mapping is also referred to as depth mapping.

Some methods are based on projecting a laser speckle pattern onto the object, and then analyzing an image of the pattern on the object. For example, PCT International Publication WO 2007/043036, whose disclosure is incorporated herein by reference, describes a system and method for object reconstruction in which a coherent light source and a generator of a random speckle pattern project onto the object a coherent random speckle pattern. An imaging unit detects the light response of the illuminated region and generates image data. Shifts of the pattern in the image of the object relative to a reference image of the pattern are used in real time reconstruction of a 3-D map of the object. Further methods for 3-D mapping using speckle patterns are described, for example, in PCT International Publication WO 2007/105205, whose disclosure is incorporated herein by reference.

SUMMARY

The present invention, in certain embodiments thereof seeks to provide an improved content projection device, which is aware of objects in its field of view, recognizing such objects as suitable for projection of content thereon. The projection device may adapt to the geometry and character of the objects by controlling scale, distortion, focus of the projected content, and varying the projected content itself. Additionally or alternatively, the projection device may adapt the projected content according to the relationship of the viewer to the projected content, such as its gaze vector, distance from the surface onto which content is projected, and other similar parameters. The 2D/3D input device used to analyze the geometry for projection can also be used to interact with the projected content.

According to disclosed embodiments of the invention, methods and apparatus are provided for the projection of content, such as the input device interface, using a 3-dimensional input device as means of determining the optimal objects to serve as substrate for such content projection.

There is provided according to embodiments of the invention an apparatus for processing data, including a sensing element for acquiring a scene including a 2-dimensional camera and a 3-dimensional camera, a processor linked to the 3-dimensional camera and the 2-dimensional camera and programmed to produce a depth map of the scene using an output of the 3-dimensional camera, and to coordinate the depth map with a 2-dimensional image captured by the 2-dimensional camera to identify a 3-dimensional object in the scene that meets predetermined criteria for projection of images thereon, and a content projector for establishing a projected image onto the 3-dimensional object responsively to instructions of the processor.

According to an aspect of the apparatus, coordinating the depth map includes identifying a position of the 3-dimensional object with six degrees of freedom with respect to a reference system of coordinates, wherein the content projector is operative to compensate for scale, pitch, yaw and angular rotation of the 3-dimensional object.

According to a further aspect of the apparatus, coordinating the depth map includes referencing a database of 3-dimensional object definitions and comparing the 3-dimensional object with the definitions in the database.

An aspect of the apparatus includes a wearable monitor, wherein the content projector is operative to establish the projected image as a virtual image in the wearable monitor or in a virtual space. The sensing element, the processor and the content projector may be incorporated in the wearable monitor.

According to a further aspect of the apparatus, the content projector is operative to establish the projected image onto a virtual surface for user interaction therewith.

According to yet another aspect of the apparatus, the processor is operative for controlling a computer application responsively to a gesture and wherein the projected image includes a user interface for control of the computer application.

According to aspect of the apparatus, the projected image includes written content.

In another embodiment, an apparatus for processing data includes a projector, which is configured to project content onto at least a part of a scene, and a processor, which is configured to detect a location of an eye of a person in the scene and to control the projector so as to reduce an intensity of the projected content in an area of the eye.

Other embodiments of the invention provide methods for carrying out the function of the above-described apparatus.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

As used herein, the term "content projection" may encompass establishment of an image of the content onto a wearable transparent monitor, such as see-through eyeglasses, and thus invisible to anyone other than the person wearing the glasses, or onto a physical object that is visible to anyone interacting with the object. The term is not limited to the above examples. It may encompass forming an image by many means, including retinal projection, projection onto see-through glasses, projection of the image into a virtual space, for example as a hologram, and other techniques for creating augmented reality.

System Architecture.

Figure 1:
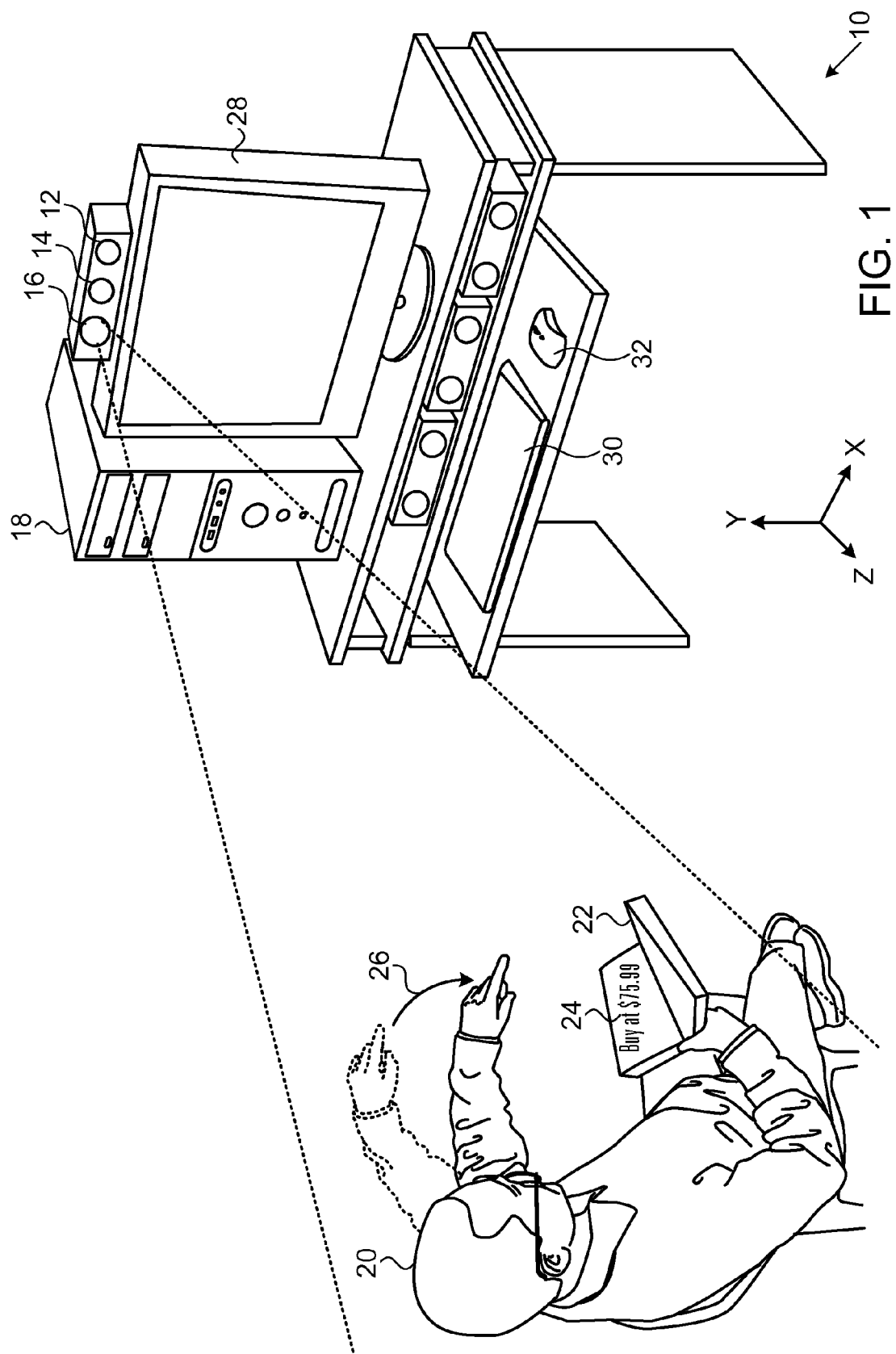
FIG. 1 is a schematic pictorial illustration of an interactive three-dimensional video display system, which is constructed and operative in accordance with a disclosed embodiment of the invention.

Turning now to the drawings, reference is initially made to FIG. 1, which is a schematic pictorial illustration of an interactive three-dimensional video display system 10, which is constructed and operative in accordance with a disclosed embodiment of the invention. The system 10 incorporates a 3-dimensional (3-D) camera 12, which may include an infrared (IR) projector and corresponding CMOS/CCD camera open for the projector band. The terms "3-dimensional camera" and "3-D camera," as used herein, refer to an imaging device used in forming a 3-D map (also referred to as a depth map) of a scene, i.e., an array of 3D coordinates, comprising a depth (Z) coordinate value of the body surface at each point (X,Y) within a predefined area. The 3-D camera 12 captures 3-D information that may includes the body (or at least parts of the body) of the user, tangible entities wielded or operated by the user for controlling a computer application, and other objects in the field of view of the 3-D camera 12. Details of a 3-D imaging assembly of this sort are described, for example, in PCT International Publication WO 2010/004542 and U.S. Patent Application Publication No. 2009/0183125, which are herein incorporated by reference. The 3-D camera 12 typically operates in the near infra-red spectrum. However the principles of the invention are equally applicable to modifications that enable the 3-D camera 12 to capture electromagnetic energy outside the near infra-red spectrum, for example far infrared or ultraviolet energy. The system 10 may also include a 2-dimensional (2-D) camera 14, which operates in the visible spectrum, and can acquire a scene with sufficient resolution to allow automatic interpretation of written information in the scene and typically produces a Red-Green-Blue (RGB) output signal.

The 3-D camera 12 and the 2-D camera 14 are cooperative with a content projector 16, all under the control of a processor, such as a computer 18.

A suitable unit for use in the system 10 that bundles the 3-D camera 12 and the 2-D camera 14 is the PrimeSensor™ Reference Design, available from PrimeSense Corporation, 104 Cambay Ct, Cary N.C., 27513, U.S.A. The content projector 16 may be the PicoP® display engine, available from MicroVision, Inc., 6222 185th Ave NE Redmond Wash., 98052. In some embodiments, the 3-D camera 12 and the 2-D camera 14 may be integral with the content projector 16 as a modification of the PrimeSensor Reference Design. In one embodiment, the 3-D camera 12 is an integrated module that includes an IR projector, which projects a pattern of spots onto the object and captures an image of the projected pattern. Alternatively, the IR projector, may be embodied as a separate module (not shown). The IR projector may be realized according to the teachings of U.S. Provisional Applications 61/372,729 (filed Aug. 11, 2010) and 61/425,788 (filed Dec. 22, 2010), as well as in PCT International Publication WO 2010/020380, all of which are herein incorporated by reference. These provisional and PCT applications also teach how to reuse the scanning hardware to project both the IR required for depth mapping and the visible content.

The processor may analyze the scene using the teachings of commonly assigned copending U.S. Patent Application Publication 2011/0293137, entitled "Analysis of Three-Dimensional Scenes", which is herein incorporated by reference.

The computer 18 may comprise a general-purpose computer processor, which is programmed in software to carry out the functions described hereinbelow. The software may be downloaded to the processor in electronic form, over a network, for example, or it may alternatively be provided on non-transitory tangible storage media, such as optical, magnetic, or electronic memory media. Alternatively or additionally, some or all of the image functions may be implemented in dedicated hardware, such as a custom or semi-custom integrated circuit or a programmable digital signal processor (DSP). Although the computer 18 is shown in FIG. 1, by way of example, as a separate unit from the 3-D camera 12, some or all of the processing functions of the computer may be performed by suitable dedicated circuitry associated with or within the housing of the 3-D camera 12 and the 2-D camera 14. As will be seen from the discussion below, elements of the system 10 may be miniaturized and incorporated in a wearable monitor to enable the user to move about and more freely interact with the scene in near real-time. In any case the 3-D camera 12 and the 2-D camera 14 function as a sensor component, which observes a scene (users and their surroundings). The computer 18 functions as a perception component, which comprehends the scene and user interaction within these surroundings as mediated or stimulated by information provided by the content projector 16.

The computer 18 may execute programs such as Nite™ Middleware, available from PrimeSense, in cooperation with the PrimeSensor Reference Design. For example, the PrimeSensor Reference Design supplies an application layer in the computer 18 with control widgets, thereby providing an application programming interface (API) that translates user gestures or postures into known deterministic application inputs. The Middleware performs image processing operations on data generated by the components of the system 10, including the 3-D camera 12 with its IR projector, and the 2-D camera 14 in order to reconstruct 3-dimensional maps of a user 20 and acquired scenes. The term "3-dimensional map" refers to a set of 3-dimensional coordinates representing the surface of a given object. One form of 3-dimensional map is referred to as a depth image or depth map, in which each pixel has a value indicating the distance from the camera to the corresponding point in the scene, rather than the brightness and color of the point as in a 2-dimensional image. The computer 18 then computes the three-dimensional coordinates of points on the surface of the control entity by triangulation, based on transverse shifts of the spots in the pattern.

In typical applications, information captured by the 3-D camera 12 is processed by the computer 18, which drives the content projector 16. The computer 18 may operate according to a program that is designed to create a natural or contrived experience for the user. As shown in FIG. 1, the system 10 has recognized a book 22 in the scene, and has projected a sale offer 24 onto the book 22: "Buy at $75.99". The user 20 is reacting to the offer by a hand gesture 26, which acts as an input to the computer 18. Gesture control of a computing device is known, for example, from commonly assigned U.S. Patent Application Publication No. 2009/0183125, which is herein incorporated by reference, and which also teaches methods of projection of scenes into a virtual image space. Gesture control is included in the functionality of the Nite™ Middleware, which may interpret gestures of the user 20, for example in response to the sale offer 24 that are acquired by the 3-D camera 12 and the 2-D camera 14.

Furthermore, as the interaction of the user 20 with the book 22 and the sale offer 24 evolves, for example, by the user 20 grasping the book 22, a gaze identification module executing in the computer 18 may recognize that the user 20 is looking at the book 22. By processing the acquired 2-D images, the book title may be recognized and interpreted in the system 10. Then, computing optimal projection parameters, a book review may be projected onto the book 22. The user 20 could scroll and interact with the projected book review as if he were viewing it on a display screen. In this way, the system 10, cooperatively with the user 20, converts the book 22 in an ad hoc fashion into a virtual information screen for the benefit of the user a20.

The system 10 optionally includes a display screen 28 and conventional input devices such as a keyboard 30 and mouse 32, which may present a user interface for administrative use, e.g., system configuration, and for operational control of the system 10 by the user 20.

Figure 2:
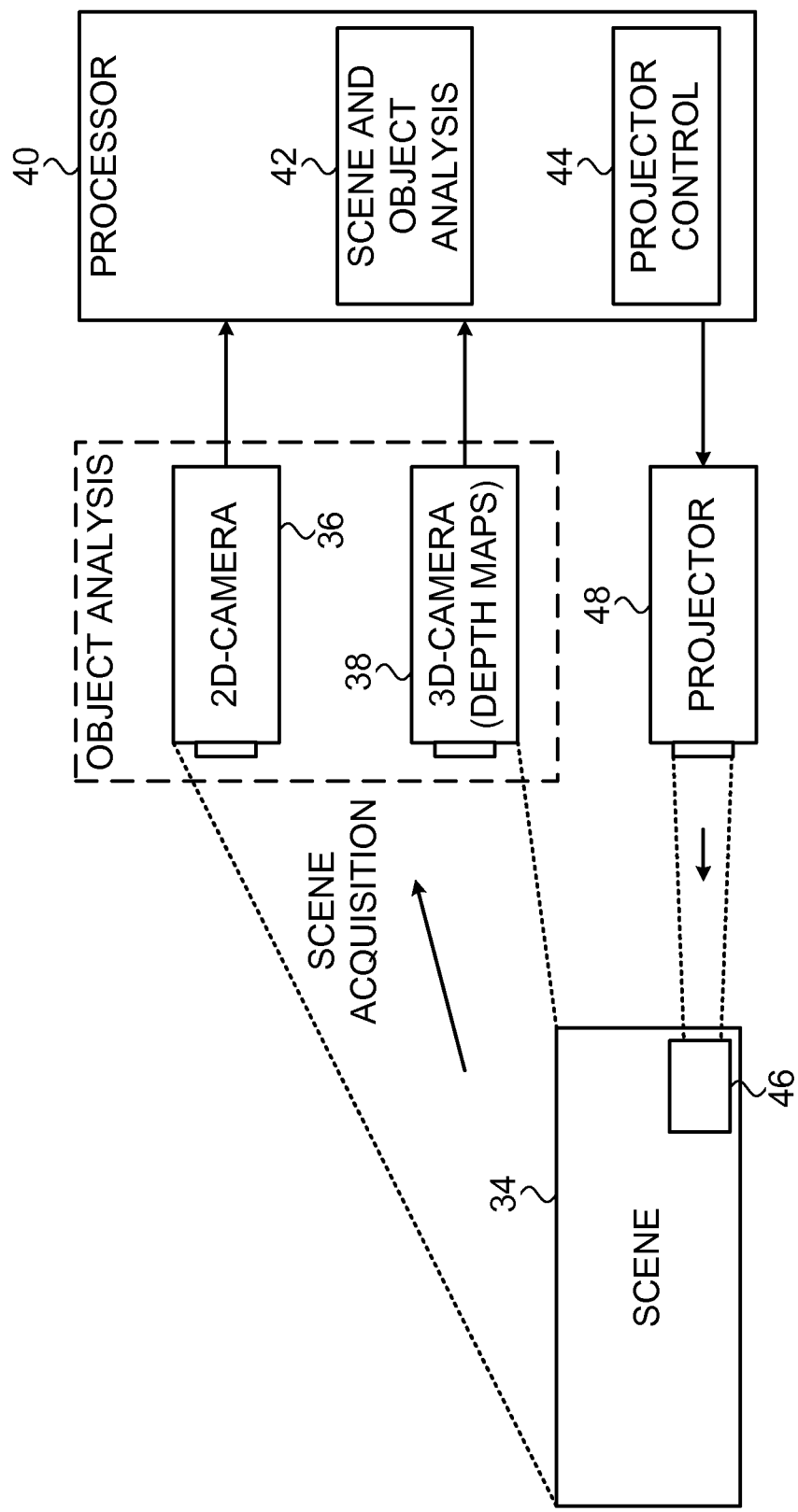
FIG. 2 is a block diagram of the system shown in FIG. 1, which is constructed and operative in accordance with an embodiment of the invention.

Reference is now made to FIG. 2, which is a block diagram of the system 10 (FIG. 1), in accordance with an embodiment of the invention. A scene 34 is acquired concurrently by two cameras, a 2-D camera 36 and a 3-D camera 38, which may be separate units or integral as a combined unit. Alternatively, the scene can be captured by the 3-D camera 38 only or by the 2-D camera 36 only, image analysis performed on the images acquired in any case. As noted above these cameras may be realized as the PrimeSensor Reference Design. Data output by the 2-D camera 36 and a 3-D camera 38 are input to a processor 40, which executes middleware, for example, the above-mentioned Nite Middleware. The Middleware places the scenes captured by the two cameras in registration. The middleware includes an object analysis module 42, which identifies objects in the scene 34 and determines their suitability for content projection thereon. A projector control module 44, another component of the Middleware, converts coordinates and characteristics of objects in the scene 34, for example an object 46, and prepares an image for projection. The module 44 issues suitable instructions for a projector 48 such that the image, typically containing information content, is projected onto the object 46. The instructions may contain corrections for distortion attributable to the scale, attitude and configuration of the object 46. Additionally or alternatively, the projector 48 may include its own mechanisms to compensate for such distortion.

The position and attitude of the user may be taken into consideration when computing projection parameters. For example, as noted above, the gaze vector toward the projected content may vary as the user moves about in the scene. The projection parameters may be accordingly adjusted to compensate for such variations, e.g., by adjusting for scale, parallax, and similar distortions, so as to simulate a realistic experience for the user. One example of such adjustment is a correction for the fact that 3-dimensional objects appear differently when viewed from different directions, i.e., different sides of the object or different 2-D projections of the object become apparent to the observer. The projection content can be adjusted as a function of the gaze vector and user position relative to virtual object, thus creating a realistic experience of the object actually being in the presence of the observer. Gaze direction can be determined by methods known in art. For example, in the case of a device embedded in see-through glasses, head position orientation is obtainable by rigid registration of the world relative to the device. Gaze direction can also be measured, for example, using eye-tracking products available from Tobii Technology, Inc., 510 N, Washington Street, Suite 200, Falls Church, Va. 22046. Gaze may then be translated into object coordinates using 3D information obtained by the sensor.

Object Awareness.

Techniques for identifying and tracking body parts are known from commonly assigned U.S. Patent Application Publication No. 2011/0052006, entitled "Extraction of Skeletons from 3-D Maps", which is herein incorporated by reference. Essentially this is accomplished by receiving a temporal sequence of depth maps of a scene containing a humanoid form. A digital processor processes at least one of the depth maps so as to find a location of a designated body part, such as the head or hand estimates dimensions of the humanoid form based on the location. The processor tracks movements of the humanoid form over the sequence using the estimated dimensions. These teachings are employed in the above-mentioned Nite Middleware, and may be enhanced by linking other known recognition routines by those skilled in the art.

For example, in the case of identifying the head of the body, the processor may segment and analyzes a 3-dimensional form to identify right and left arms, and then search the space between the arms in order to find the head. Additionally or alternatively recognition techniques may be used. The depth maps may be registered with 2-dimensional images of the head or other object. The processor may apply a pattern or face recognition technique to identify the face of a humanoid form in a 2-dimensional image. The face location in the 2-dimensional image is then correlated with the location of the head of the 3-dimensional form. Using the same techniques, an entire scene may be analyzed, segmented, and known categories of objects identified as candidates for projection of images thereon.

Figure 7:
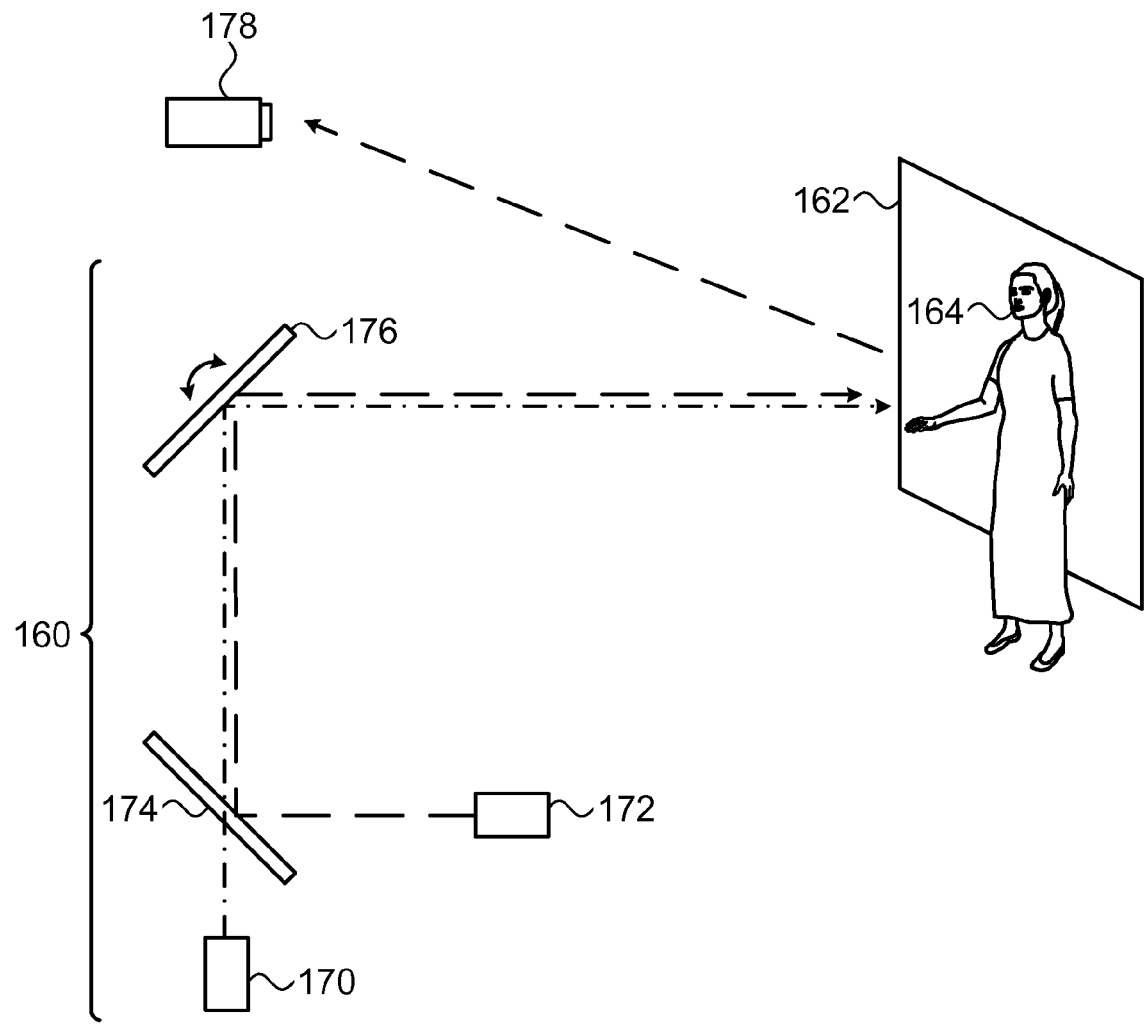
FIG. 7 is a schematic illustration of elements of an interactive projection system, in accordance with an alternative embodiment of the invention.

In one embodiment, which is shown in FIG. 7, upon recognizing the head in an area in which an image is being projected, the processor may instruct the projector to reduce the intensity of the light that is projected in the area of the head (or turn it off entirely) in order to avoid projecting bright light into the eyes, which can be uncomfortable and even hazardous.

Object Processor.

Figure 3:
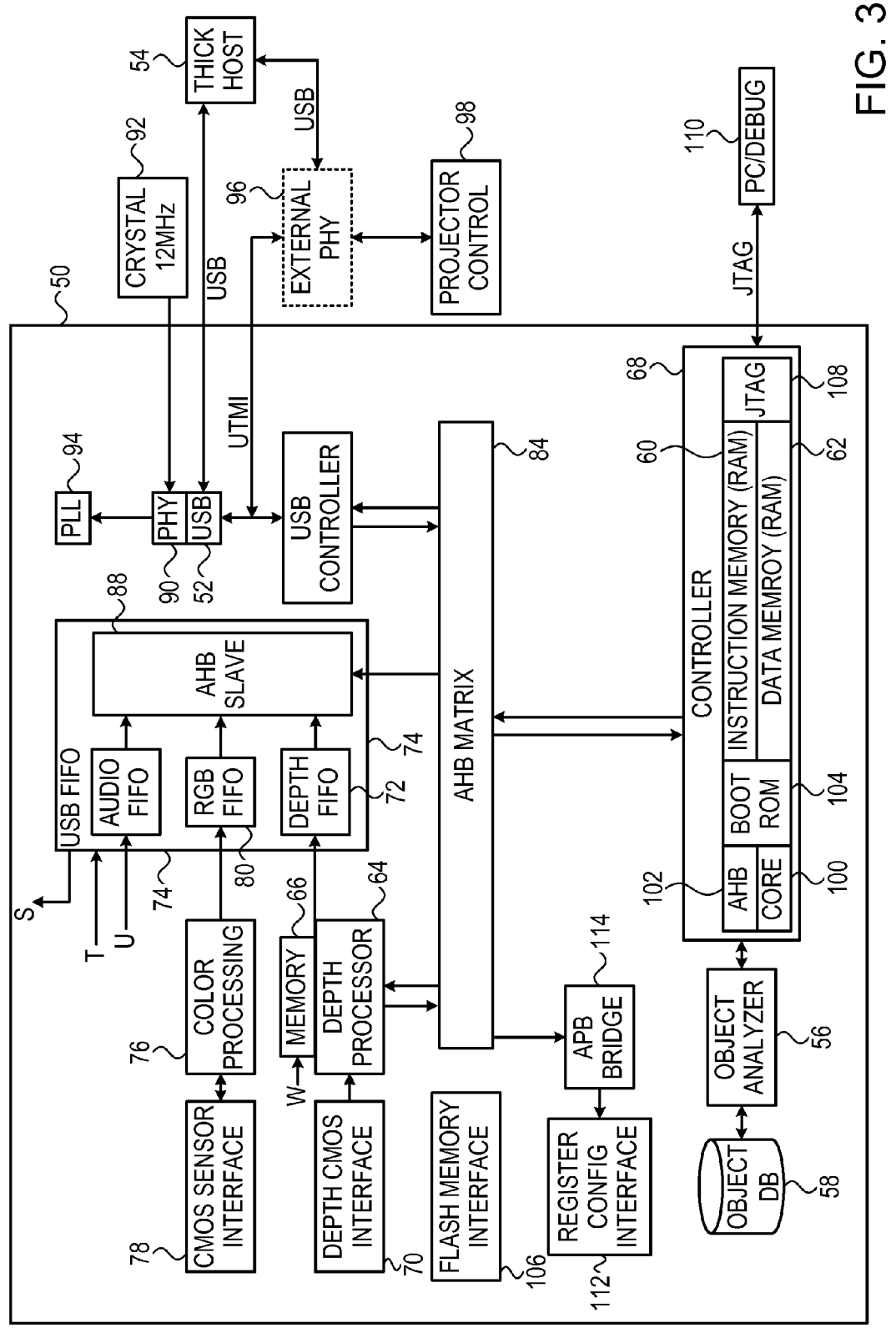
FIG. 3 is a block diagram that shows functional elements of a portion of an exemplary processing device, which is constructed and operative in accordance with an embodiment of the invention.

Reference is now made to FIG. 3, which is a block diagram that schematically shows functional elements of a portion of an exemplary processing device 50, which is a component of the processor 40 (FIG. 2), and which is constructed and operative in accordance with an embodiment of the invention. The processing device 50 may be fabricated as a dedicated integrated circuit, on a single semiconductor substrate, with a USB port 52 to an optional host computer 54. Device 50 may include other interfaces, as well, including an object analyzer 56. The object analyzer 56 is linked to a database 58, which holds a library containing descriptions of objects to be recognized and evaluated by the object analyzer 56. It will be appreciated that alternative configurations of the processing device 50 can be constructed by those skilled in the art. As noted above, the operations of the processing device 50 may be controlled by middleware residing in instruction memory 60 and data memory 62

A depth processor 64 processes the information captured by the 3-D camera 12 (FIG. 1) in order to generate a depth map. Depth processor 64 uses dedicated memory space in a memory 66. This memory can also be accessed by a controller 68, which is described hereinbelow, but typically not by the host computer 54. Rather, depth processor 64 may be programmed by the host computer 54 via an application program interface (API).

Depth processor 64 receives input IR data from 3-D camera 12 (FIG. 1) via a depth CMOS interface 70. The depth processor 64 processes the video data in order to generate successive depth maps, i.e., frames of depth data. The depth processor 64 loads these data into a depth first-in-first-out (FIFO) memory 72 in a USB FIFO unit 74.

In parallel with the depth input and processing operations, a color processing block 76 receives input color video data from the 2-D camera 14 (FIG. 1) via a color CMOS sensor interface 78. The block 76 converts the raw input data into output frames of RGB video data, and loads these data into a RGB FIFO memory 80 74 in the unit 74. Alternatively, the block 76 may output the video data in other formats, such as YUV or Bayer mosaic format.

The unit 74 acts as a buffer level between the various data suppliers and a USB controller 82. The unit 74 packs and formats the various data types according to different classes (such as a USB video class and a USB audio class), and also serves to prevent data loss due to USB bandwidth glitches. It arranges the data into USB packets according to the USB protocol and format prior to transferring them to the USB controller.

A high-bandwidth bus, such as an Advanced High-performance Bus (AHB) matrix 84, is used to carry data between the components of the processing device 50, and specifically for conveying data from the unit 74 to the USB controller 82 for transfer to the host computer 54. (AHB is a bus protocol promulgated by ARM Ltd., of Cambridge, England.) When there are packets ready in the unit 74 and space available in the internal memory of USB controller 82, the USB controller 82 uses direct memory access (DMA) to read data from memory 72, memory 80, and an audio FIFO memory 86 via an AHB slave module 88 and the matrix 84. The USB controller 82 multiplexes the color, depth and audio data into a single data stream for output via the USB port 52 to the host computer 54.

For the purpose of USB communications, they processing device 50 comprises a USB physical layer interface, PHY 90, which may be operated by the USB controller 82 to communicate via a suitable USB cable with a USB port of the host computer 54. The timing of the USB PHY is controlled by a crystal oscillator 92 and a phase-locked loop 94 (PLL), as is known in the art.

Alternatively, USB controller 86 may optionally communicate with the host computer via a USB 2.0 Transceiver Macrocell Interface (UTMI) and an external PHY 96.

Various external devices may connect with the processing device 50 cooperatively with the host computer 54, including a projector control module 98, which accepts instructions from the processing device 50 and the host computer 54 to effect a desired image projection onto specified coordinates in space.

The controller 68 is responsible for managing the functions of the processing device 50, including boot-up, self-test, configuration, power and interface management, and parameter adjustment.

The controller 68 may comprise a digital signal processor (DSP) core 100 and an AHB master 102 for controlling data movement on the matrix 84. Typically, controller 68 boots from a boot read-only memory 104, and then loads program code from a flash memory (not shown) via a flash memory interface 106 into instruction random-access memory 60 and data memory 62. The controller 68 may, in addition, have a test interface 108, such as a Joint Test Action Group (JTAG) interface, for purposes of debugging by an external computer 110.

The controller 68 distributes configuration data and parameters to other components of the processing device 50 via a register configuration interface 112, such as an Advanced Peripheral Bus (APB), to which the controller is connected through the matrix 84 and an APB bridge 114.

Further details of the processing device 50 are disclosed in the above-noted PCT International Publication WO 2010/004542.

Object Analysis.

Continuing to refer to FIG. 3, the object analyzer evaluates data developed by the depth processor 64 in cooperation with the block 76 and the unit 74 to evaluate a scene captured by the 3-D camera 12 (FIG. 1).

The algorithm executed by the object analyzer 56 may be dictated by an application program in the host computer 54. For example, the object analyzer 56 may be instructed to search for and report one or more known objects in the scene that are specified in the database 58. The host computer 54 may thereupon instruct the content projector 16 (FIG. 1) to project images on the selected object or objects. Additionally or alternatively, the object analyzer 56 may be instructed to identify and report objects meeting predefined criteria, without resort to the database 58.

The data communicated by the object analyzer 56 with respect to an identified object typically includes the size and location of the object, as well as its orientation, preferably with six degrees of freedom, including scale, pitch, yaw and angular rotation with respect to a reference system of coordinates. This information allows the projector to compensate for distortions by suitably scaling and contorting a projected image so as to be project it onto the selected object such that the viewer sees an image that is substantially distortion-free. Configuration of a projected image is known, e.g., from U.S. Patent Application Publication No. 20110081072, entitled "Image Processing Device, Image Processing Method, and Program". The image may be configured in software in order to avoid the expense of complex optical arrangements and to more easily achieve freedom from such effects as off-axis image distortion Alternatively, As noted above, commercially available projects may provide their own compensation for distortion control.

Figure 4:
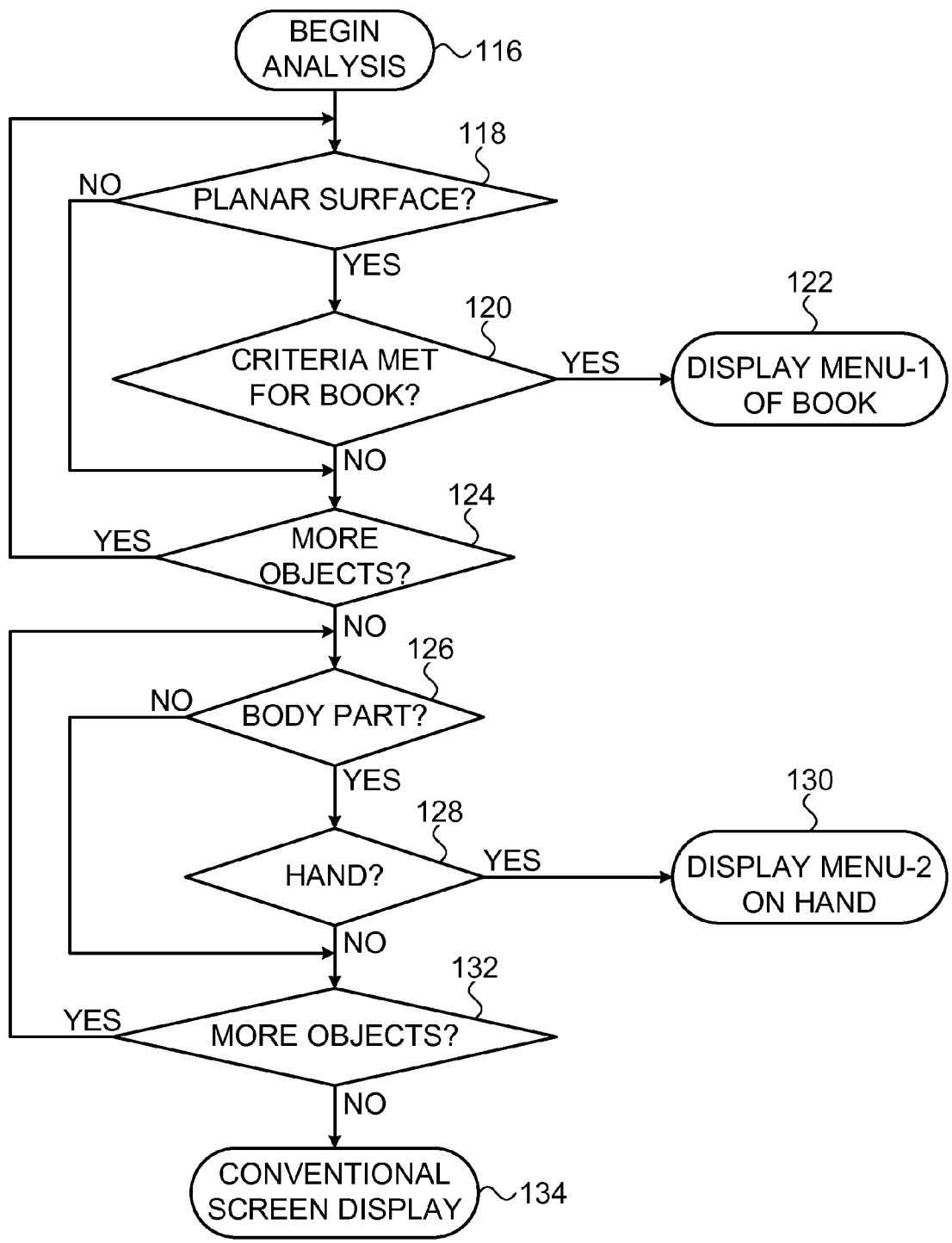
FIG. 4 is an exemplary flow chart of a method of identifying 3-dimensional objects in a scene in accordance with an embodiment of the invention.

Reference is now made to FIG. 4, which is an exemplary flow chart of a method of identifying 3-dimensional objects in a scene in accordance with an embodiment of the invention. For convenience of presentation, the method is disclosed in conjunction with the apparatus shown in FIG. 1 and FIG. 3, but it is applicable to apparatus configured differently. The process steps are shown in a particular linear sequence in FIG. 4 for clarity of presentation. However, it will be evident that many of them can be performed in parallel, asynchronously, or in different orders. Those skilled in the art will also appreciate that a process could alternatively be represented as a number of interrelated states or events, e.g., in a state diagram. Moreover, not all illustrated process steps may be required to implement the process. Furthermore, many details may vary according to the dictates of the host computer 54 and the requirements of its application program.

Assume that the viewer is located in a bookshop. At initial step 116 an application program executing in the host computer 54 would like to identify an open book displaying textual information. This is a 3-dimensional object having a known definition in the database 58 that includes at least one generally light-colored planar surface. The 3-D camera 12 is enabled and a 3-dimensional scene captured in the processing device 50. The object analyzer 56 evaluates the scene, locates and identifies objects in 3-dimensional space.

At decision step 118 it is determined whether a planar surface has been located in the scene.

Control now proceeds to decision step 120, where it is determined if the planar surface meets criteria for a book. The criteria may involve, inter alia, size, proximity to certain other objects, and geometric details corresponding to a closed or open book.

If the determination at decision step 120 is affirmative, then control proceeds to final step 122. The coordinates and orientation of the book are reported by the object analyzer 56 to the controller 68, which instructs the projector control module 98 cooperatively with the host computer 54 to display an application-determined image (MENU-1) on the identified book. The image may contain, for example, options to purchase the item, or obtain additional details, for example book reviews, and popularity ratings. Indeed, if the 3-D camera 12 was successful in capturing the title of the book, the additional details may be included in the projected image. It is assumed that the host computer 54 has access to a local or distributed database or can make automatic inquiries via the Internet.

The coordinates and other characteristics of the book (or of any other object onto which an image is to be projected) can also be used in controlling projection parameters such as the intensity of light projected in the image. Thus, for example, the projector may increase the intensity of the projected light when the object is relatively far from the projector and decrease it for nearby objects. Additionally or alternatively, the reflectivity of the object may be assessed (using image data from camera 36, for example), and the intensity of the projected light may be increased when projected onto less reflective objects and decreased for more reflective objects.

If the determination at decision step 120 is negative, then control proceeds to decision step 124. A determination is made if more objects are present in the scene for processing.

If the determination at decision step 124 is affirmative, then control returns to decision step 118.

If the determination at decision step 124 is negative, then a second state of the method commences. It is assumed that the application program falls through to a secondary option, in which an image is projected on the user's hand, if visible to the 3-D camera 12.

Control now proceeds to decision step 126, where it is determined if a body part is present in the scene. This may be accomplished using the teachings of the above-noted U.S. Patent Application Publication No. 2011/0052006.

If the determination at decision step 126 is affirmative, then control proceeds to decision step 128, where it is determined if the body part is a hand.

If the determination at decision step 128 is affirmative, then control proceeds to final step 130, which is similar to final step 122. However, a different menu (MENU-2) is now projected on the hand, which may include, for example, control options for the governing computer application. In both final step 122 and final step 130 the image is configured so as to create a natural feeling on the part of the user when interacting with the content.

Alternatively or additionally, the object analyzer may determine whether the body part in question is a head and if so, may instruct the projector to reduce or turn off the projected intensity in the area of the head. This option is described in greater detail hereinbelow with reference to FIG. 7.

If the determination at decision step 128 is negative, then control proceeds to decision step 132. A determination is made if more objects are present in the scene for processing.

If the determination at decision step 132 is affirmative, then control returns to decision step 126. Otherwise, control passes to final step 134, in which a conventional menu display is presented on a display screen. Final step 134 represents a failure to identify a suitable external object for projection of an image thereon. It will be appreciated that the method shown in FIG. 4 can be varied, and elaborated as required to comply with the specifications of the governing application program. Recognition and prioritization of various objects and images may be programmed so as to accommodate the configuration of a particular scene and the needs of the program itself.

Alternate Embodiment 1

Figure 5:
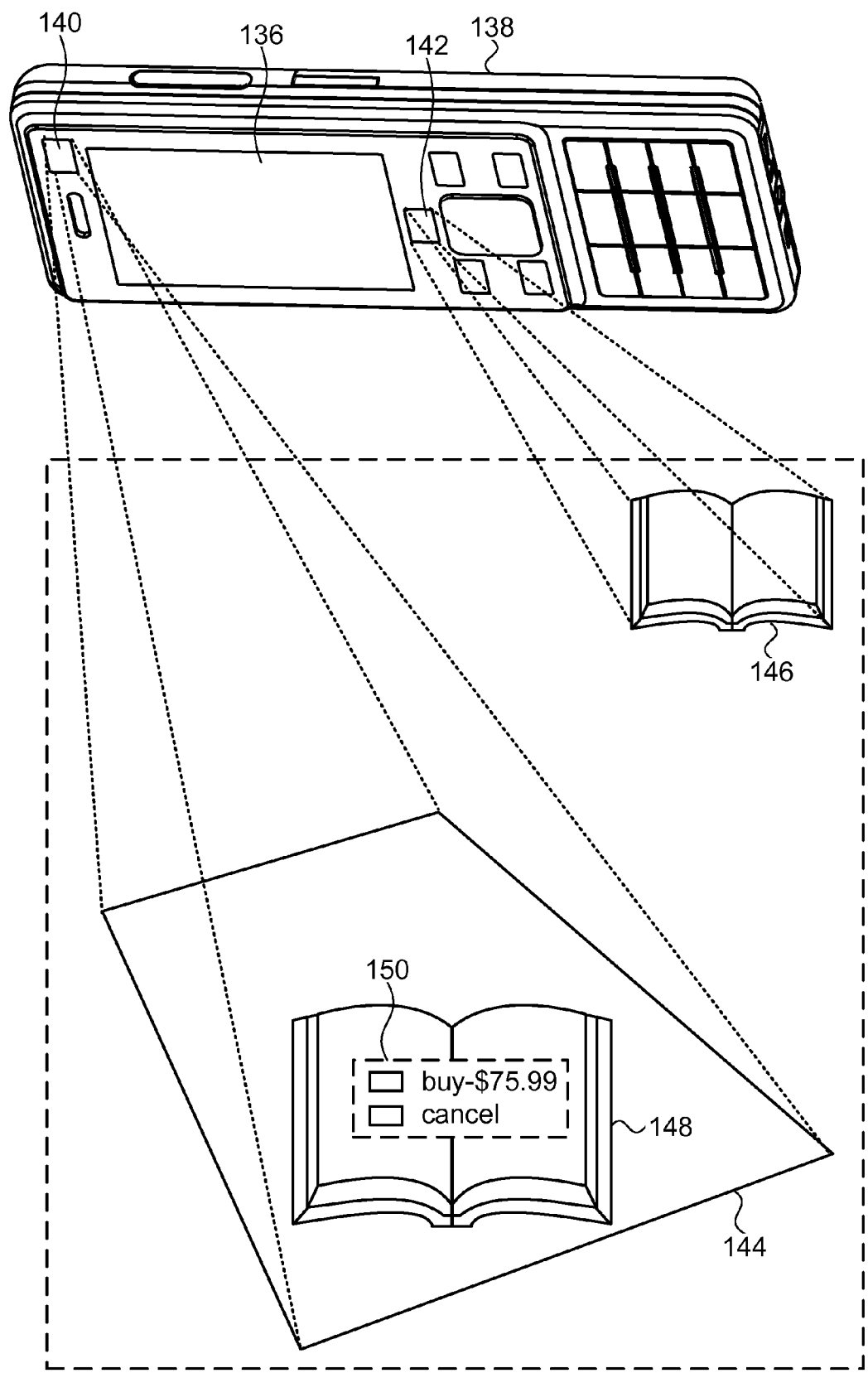
FIG. 5 illustrates a screen of a mobile device that is projected onto a virtual surface in accordance with an embodiment of the invention.

This embodiment is similar to the first embodiment, except a convenient virtual surface is provided for projection of images and for access by the user. Reference is now made to FIG. 5, which illustrates a screen 136, typically of a mobile information device 138, such as a cellular telephone, e.g., a "smart phone" that is projected onto a virtual surface in accordance with an embodiment of the invention. Such devices are too small for convenient interaction and media consumption. The screen 136 incorporates a miniature projector 140 and sensing device 142, which have the same functions as the 3-D camera 12 and content projector 16 in the embodiment of FIG. 1. Projectors suitable for this purpose are available, for example, from Microvision. In this embodiment, the projector 140 projects an image onto a virtual projection surface 144, which is enlarged relative to the screen 136.

In one mode of operation, the projector 140 may create an enlarged version of information displayed on the screen 136.

In another mode of operation the sensing device 142 captures an external scene. The mobile information device 138 is configured to perform the method of scene analysis described above with reference to FIG. 4. In this example, an open book 146 was identified in the external scene. An application program executing in the mobile information device 138 has caused the projector 140 to project an image 148 of the book 146 onto the projection surface 144, and to superimpose a menu 150 onto the image 148. The menu 150 invites the user to purchase the book 146 at a sales price of $75.99 or to cancel the display.

Alternate Embodiment 2

In the first embodiment, images have been described as projections onto a physical object, e.g., a book or a hand. In this embodiment, the projector may be embodied as a device that projects content onto a wearable monitor, such as eyeglasses. In this embodiment final step 122 and final step 130 are modified in the method of FIG. 4.

Figure 6:
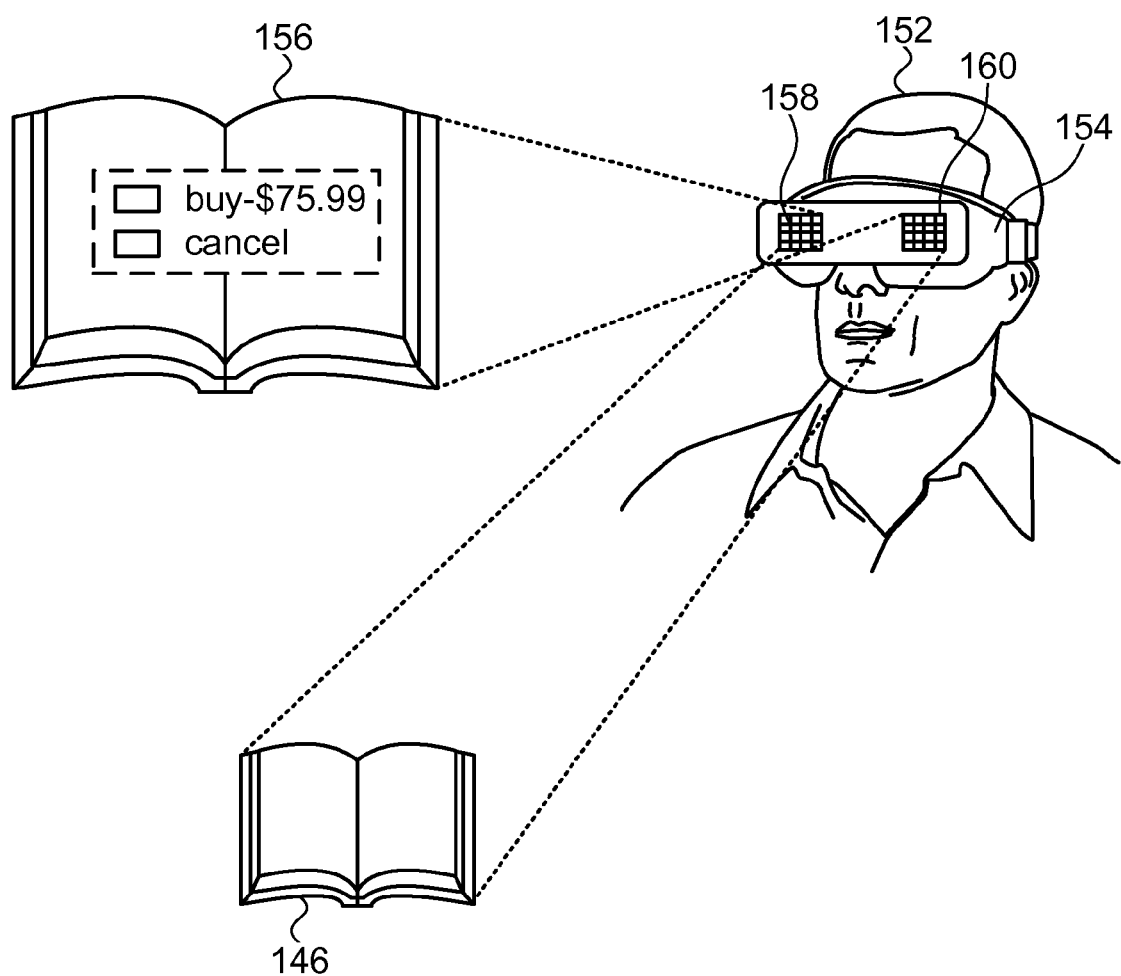
FIG. 6 illustrates an interactive three-dimensional video display system that includes a wearable monitor in accordance with an embodiment of the invention.

Reference is now made to FIG. 6, which illustrates an interactive three-dimensional video display system having a wearable monitor in accordance with an embodiment of the invention. The system is configured to project the respective images onto the wearable monitor rather than the object themselves Such devices offer possibilities of allowing a computer-generated image produced by the method described with reference to FIG. 4 to be generated and optionally superimposed on a real-world view. Such devices may operate by projecting the computer-generated image through a partially reflective minor while viewing an external scene. Alternatively the device may mix the computer-generated image and real-world view electronically.

In the example of FIG. 6, a user 152 employs a wearable monitor 154, which is capable of displaying stereoscopic imagery. The wearable monitor 154 is provided with or interfaced with components similar to those of the system 10 (FIG. 1). Like the system 10, the wearable monitor 154 is adapted to analyze an external scene. In this example, it identifies the book 146, and generates an image 156 containing the same information as the image 148 (FIG. 5). The wearable monitor 154 may be a separate unit or may incorporate other elements of the system 10. In the embodiment of FIG. 6, the wearable monitor 154 includes a miniature projector 158 and a sensing element 160. Additionally or alternatively, the wearable monitor 154 may communicate with an external processor or sensing device via a wireless link. Suitable wearable helmet mounted displays and see-through eyewear displays for use as the wearable monitor 154 are available as the Madison line of Novero (novero.com) or from Lumus Ltd., 2 Bergman Street Rehovot 76705, Israel.

While the image 156 is actually established within the wearable monitor 154, in some embodiments it may be perceived by the user 152 as being superimposed in an external region of space as shown in FIG. 6. The wearable monitor 154 in such embodiments may be equipped with positioning, head-tracking and eye-tracking subsystems.

Alternate Embodiment 3

FIG. 7 is a schematic side view of a scanning projector 160 and associated components in a system for adaptive projection, in accordance with still another embodiment of the present invention. Projector 160 may be used in system 10 (FIG. 1), and offers enhanced capabilities in using the same scanning hardware to simultaneously project both an infrared (IR) pattern (for 3-D mapping) and visible content that can be viewed on a screen 162 or other surface. In this sort of embodiment, an image capture device, such as a camera 178 captures an image of the projected IR pattern, and this image is processed in order to create a 3D map of the scene containing screen 162 (which in this example contains a person 164). Based on the 3-D map, projector 160 may then project onto the scene a visible image that is tailored to the shape and contours of the objects in the scene, as noted above.

As shown in FIG. 7, a beam combiner 174, such as a dichroic reflector, aligns the IR beam from a radiation source 170 with a visible beam from a visible light source 172. Source 172 may be monochromatic or polychromatic. For example, source 172 may comprise a suitable laser diode or LED for monochromatic illumination, or it may comprise multiple laser diodes or LEDs of different colors (not shown), whose beams are modulated and combined in order to project the desired color at each point in the field of view. For this latter purpose, combiner 174 may comprise two or more dichroic elements (not shown) in order to align all of the different colored and IR beams.

A scanning mirror 176 (or a pair of scanning mirrors—not shown) scans the beams from sources 170 and 172, typically in a raster pattern, over the field of view of camera 178. While the beams are scanned, projector control 44 in processor 40 (FIG. 2) modulates sources 170 and 172 simultaneously: Source 170 is modulated to generate the desired pattern for 3-D mapping at each point in the field, while source 172 is modulated according to the pixel value (intensity and possibly color) of the visible image that is to be projected at the same point (which may be based on the 3-D map of the scene at that point). Because the visible and IR beams are optically aligned and coaxial, the visible image will be automatically registered with the 3-D map. Alternatively, in place of camera 178, projector 160 may also contain another sort of sensing element, such as an IR detector (not shown), whose field of view is scanned so as to coincide with the projection scan. Such detection schemes are described, for example, in the above-mentioned PCT International Publication WO 2010/020380. Additionally or alternatively, the projector may contain also contain a detector or detectors for visible light in order to form a color image of the scene.

The projector shown in FIG. 7 is particularly useful in adjusting the projected image to the characteristics of the scene, since it enables the projected pattern to be modified on the fly, pixel by pixel, in perfect registration with the 3-D map that provides the scene information.

As a particular example, when the presence of person 164 is detected in the scene (by suitably segmenting and analyzing the 3-D map), the intensity of source 172 may be decreased, possibly to the point of turning off the source altogether, in the area of the person's head or at least in the area of the eyes. In this manner, projector 160 avoids shining bright light into the person's eyes, which could otherwise cause discomfort and even eye damage.

This principles of this embodiment may be applied using other types of imaging and projection devices and are not limited to the particular sort of scanning projector and mapping device that are described above. For example, other types of mapping and imaging devices, as well as other image analysis techniques, which may operate on either a 2-D image captured by a suitable capture device or a 3-D map, may be applied in identifying the area of the eyes for this purpose. Similarly, substantially any suitable type of electronically-driven projector (including standard video projectors) can be controlled in this manner to reduce intensity in the area of the eyes, as long as an image or map of the area onto which the projector casts its beam is registered in the frame of reference of the projector. Thus, when the location of the head and/or eyes that is found in the image or map, the corresponding part of the projected beam can be dimmed accordingly.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method for augmented interaction with a data processing system, comprising the steps of:
   receiving a depth map of a scene containing 3-dimensional objects meeting first criteria for projection of images thereon;
   receiving a 2-dimensional image of the scene;
   using a digital processor, processing the depth map to locate the 3-dimensional objects;
   executing a computer application to analyze the 2-dimensional image to identify a most suitable one of the 3-dimensional objects according to second criteria;
   projecting a user interface to the computer application as a content-containing image onto the most suitable one of the 3-dimensional objects;
   using the digital processor, recognizing a gesture;
   interpreting the gesture as an interaction with the user interface; and
   controlling the computer application responsively to the interaction.

2. The method according to claim 1, wherein processing the depth map comprises identifying a position of the most suitable one of the 3-dimensional objects with six degrees of freedom with respect to a reference system of coordinates, and projecting a user interface comprises compensating for scale, pitch, yaw and angular rotation thereof.

3. The method according to claim 1, wherein processing the depth map comprises referencing a database of 3-dimensional object definitions and comparing the 3-dimensional objects with the definitions in the database.

4. The method according to claim 1, wherein one of the 3-dimensional objects in the depth map is a portion of a humanoid form.

5. A method for augmented interaction with a data processing system, comprising the steps of:
   receiving a depth map of a scene containing 3-dimensional objects meeting first criteria for projection of images thereon;
   using a digital processor, processing the depth map to locate the 3-dimensional objects;
   executing a computer application to identify a most suitable one of the 3-dimensional objects according to second criteria;
   projecting an image of the most suitable one of the 3-dimensional objects onto a virtual surface;
   using the digital processor, recognizing a gesture;
   interpreting the gesture as an interaction with the image of the one object; and
   controlling the computer application responsively to the interaction.

6. The method according to claim 5, wherein processing the depth map comprises identifying a position of the most suitable one of the 3-dimensional objects with six degrees of freedom with respect to a reference system of coordinates, and projecting the image of the one object comprises compensating for scale, pitch, yaw and angular rotation of the one object.

7. The method according to claim 5, wherein processing the depth map comprises referencing a database of 3-dimensional object definitions and comparing the 3-dimensional objects in the depth map with the definitions in the database.

8. The method according to claim 5, wherein the image of the most suitable one of the 3-dimensional objects further comprises a user interface for control of the computer application.

9. A method for augmented interaction with a data processing system, comprising the steps of:
   receiving a depth map of a scene containing 3-dimensional objects meeting first criteria for projection of images thereon;
   using a digital processor, processing the depth map to locate the 3-dimensional objects;
   executing a computer application to identify a most suitable one of the 3-dimensional objects according to second criteria;
   projecting an image of the one object onto a wearable monitor;
   using the digital processor, recognizing a gesture of a user;
   interpreting the gesture as an interaction with the image of the most suitable one of the 3-dimensional objects; and
   controlling the computer application responsively to the interaction.

10. The method according to claim 9, wherein processing the depth map comprises identifying a position of the one object with six degrees of freedom with respect to a reference system of coordinates, and projecting the image of the most suitable one of the 3-dimensional objects comprises compensating for scale, pitch, yaw and angular rotation of the one object.

11. The method according to claim 9, wherein processing the depth map comprises referencing a database of 3-dimensional object definitions and comparing the 3-dimensional objects with the definitions in the database.

12. The method according to claim 9, wherein the image of the most suitable one of the 3-dimensional objects further comprises a user interface for control of the computer application.

13. An apparatus for processing data, comprising:
   a projector, which comprises:
      a first radiation source, which emits a beam of infrared radiation;
      a second radiation source, which emits a visible light beam, which is modulated to form content for projection onto at least a part of a scene; and
      scanning optics configured to project both the infrared beam and the visible light beam onto the scene simultaneously;
   a sensing device, which is configured to capture the infrared radiation returned from the scene and output a signal in response to the captured radiation; and
   a processor, which is configured to process the signal in order to generate a 3-dimensional map of the scene and to process the 3-dimensional map in order to detect a location of an eye of a person in the scene and to control the projector so as to reduce an intensity of the projected content in an area of the eye.

14. The apparatus according to claim 13, wherein the first radiation source is controlled to create a pattern of spots on the scene, and wherein the processor is configured to derive a 3-dimensional map of the scene from the pattern of the spots and to process the 3-dimensional map in order to identify the area of the eye.

15. The apparatus according to claim 13, wherein the sensing device has a field of view that is scanned so as to coincide with projection of the infrared beam and the visible light beam onto the scene.

16. A method for processing data, comprising:
    projecting content onto at least a part of a scene by scanning a visible light beam over the scene, while modulating the visible light beam to form the content that is projected onto at least the part of the scene;
    scanning a beam of infrared radiation over the scene simultaneously with the visible light beam, capturing the infrared radiation returned from the scene, processing the captured radiation to generate a 3-dimensional map of the scene, and processing the 3-dimensional map in order to detect a location of an eye of a person in the scene; and
    controlling projection of the content so as to reduce an intensity of the projected content in an area of the eye.

17. The method according to claim 16, wherein scanning the beam of the infrared radiation comprises controlling the beam of the infrared radiation to create a pattern of spots on the scene, and wherein processing the captured radiation comprises deriving a 3-dimensional map of the scene from the pattern of the spots, and processing the 3-dimensional map in order to identify the area of the eye.

18. The method according to claim 16, wherein capturing the infrared radiation comprises scanning a field of view of a sensing device, which senses the infrared radiation, so as to coincide with projection of the infrared beam and the visible light beam onto the scene.

\* \* \* \* \*